Oct. 19, 1954     A. A. FREVERT     2,692,047
SEED CLEANER
Filed March 12, 1951     2 Sheets-Sheet 1
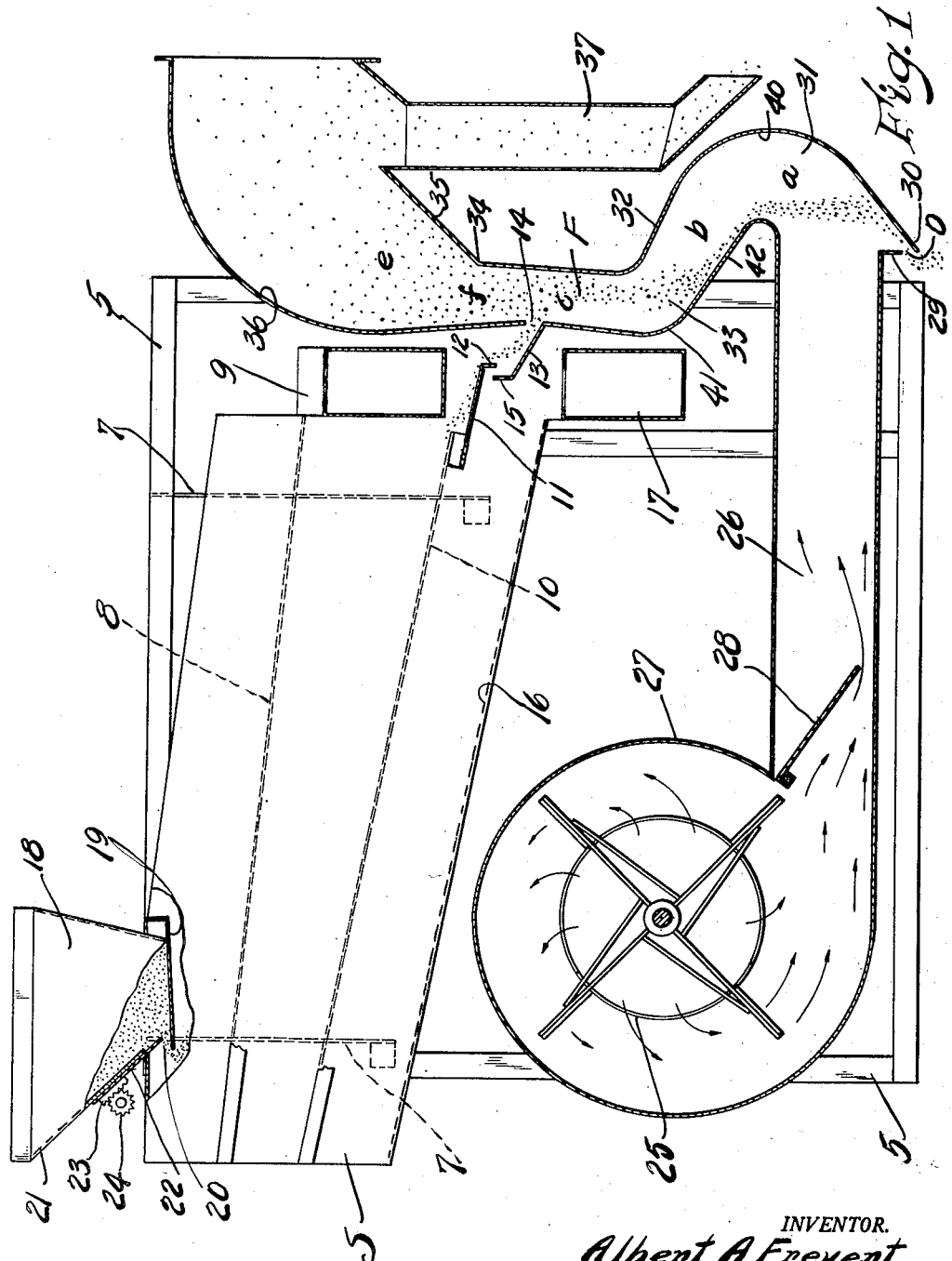
INVENTOR.
Albert A. Frevert,
BY
Frank C. Fearman.
ATTORNEY Oct. 19, 1954     A. A. FREVERT     2,692,047
SEED CLEANER
Filed March 12, 1951     2 Sheets-Sheet 2
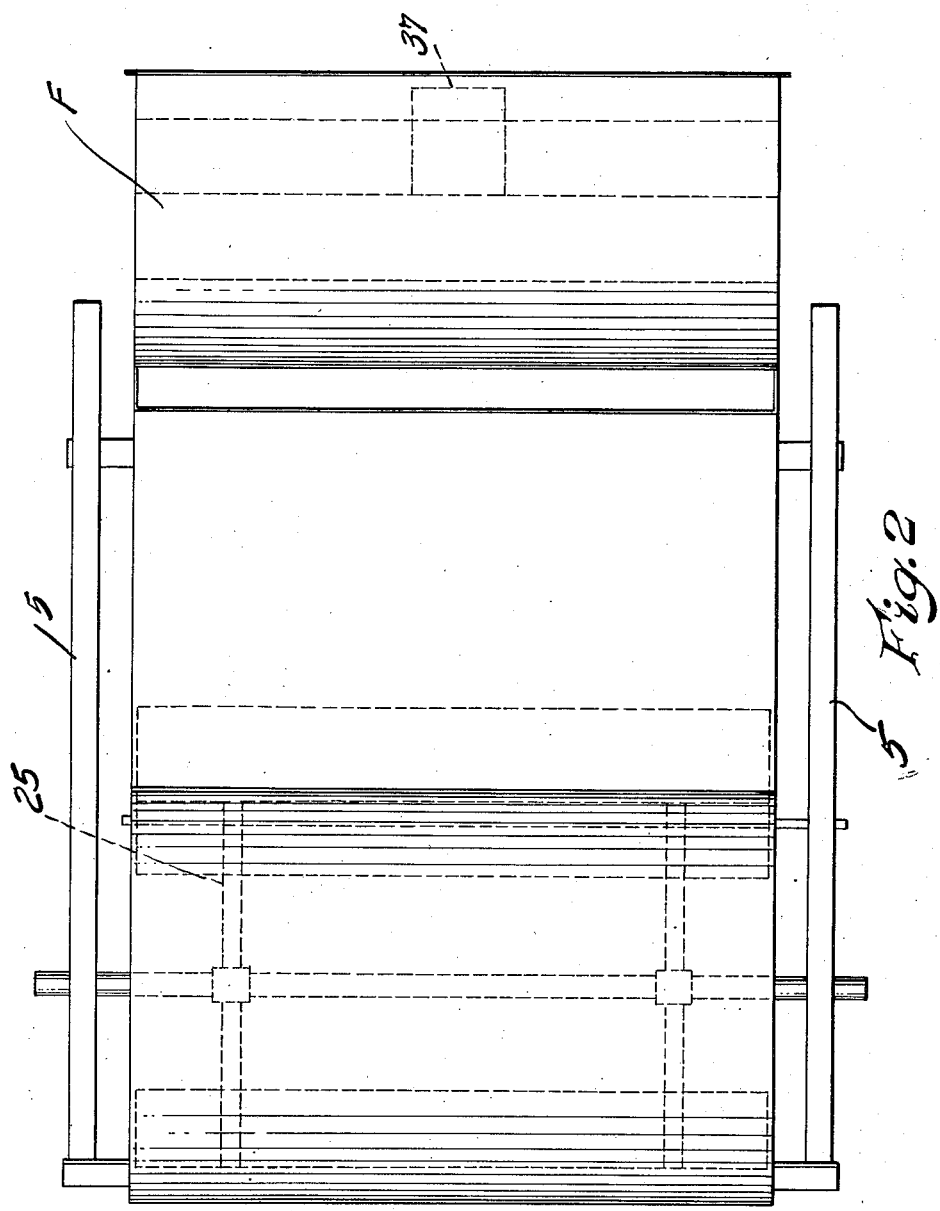

Patented Oct. 19, 1954

2,692,047

UNITED STATES PATENT OFFICE 2,692,047

SEED CLEANER

Albert A. Frevert, Alma, Mich., assignor to Crippen Manufacturing Company, Alma, Mich.

Application March 12, 1951, Serial No. 215,073

4 Claims. (Cl. 209—139)

This invention relates to seed cleaners for the separation and cleaning of grain and seeds of all kinds, and more particularly to a seed cleaner having a blower fan, duct, and air flue of specific design and construction for regulating the air velocity to suit the seed being processed.

One of the prime objects of the invention is to provide a seed cleaning machine including a flue in which the air velocity and pressures can be set and automatically maintained at predetermined values, so that seeds and grains of various kinds may be accurately weighed and separated.

Another object is to provide a flue of varying cross-sectional areas and curvatures throughout its length, thus creating varying velocities and pressures at predetermined points intermediate its length, so that all seeds fed to the flue will pass through the high velocity areas, thus effecting an accurate weighing of the incoming sized seeds in the air stream, so that all seeds discharge into the high velocity air stream, the good seed or grain falling through the high velocity air to discharge outlet and thence to bins, while the light, imperfect seeds and culls etc. are carried up and into gradually diverging high pressure and low velocity areas, thence falling into a light seed spout or being discharged to atmosphere.

A further object is to design a flue construction of convergent-divergent principle which provides higher air velocity at the point of seed intake in the restricted throat section of the flue, and in which the incoming air is directed against the inner side wall of the flue directly below the seed entrance to provide a venturi effect to the air flow, eliminating any outblast through the incoming seed stream so that the air separation will be thorough.

Still a further object is to provide a flue arrangement including a higher velocity seed weighing throat section or area of predetermined length and provided with an entrance into which the sized seed is discharged, said flue being provided with reversely curved, high pressure areas below said throat section, so that a higher air velocity is obtained at the inner side wall constricted throat portion of the flue, the good seeds of proper shape, size and weight falling through the high velocity throat area into said low velocity areas for disposal as desired, while the culls, light seed, etc. are carried up and out of the flue or to a tailings spout connected therewith.

A further object still is to provide a flue arrangement formed with a high velocity throat section of predetermined length and in which the seed inlet entrance is located, the wall of the flue directly over said entrance being spaced slightly outwardly from the wall at the lower edge of the seed entrance to provide a venturi effect and eliminate any outblast of the air through said seed entrance.

Another object is to provide a simple and effective fan duct having a gate for controlling the volume of air from the fan, to the end that the volume and pressure of air flowing through the flue may be readily adjusted and regulated to suit the various types of seeds being cleaned.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit or sacrificing any of the advantages of the invention.

In the drawings:

Fig. 1 is a part sectional, side elevational view of a seed cleaner equipped with my duct control and flue principle, the arrows indicating the flow of air from the fan.

Fig. 2 is a top, plan view thereof.

Referring now more specifically to the drawings in which I have shown the preferred embodiment of my invention, the numeral 5 indicates the frame of the seed cleaning machine; this can be of any desired shape and design, and a conventional shoe S is hung in said frame by means of strap hangers 7 as usual, said shoe being vibrated by suitable vibrating mechanism (not shown).

An inclined scalping screen 8 is mounted in the shoe S and a spout 9 spans the discharge end of the screen and leads to a bin or other receptacle (not shown) for discharging the product passed over the scalping screen.

A grading screen 10 is also mounted in the shoe S directly below the scalping screen and onto which the sized product falls, and a lip extension 11 is connected to the end of said screen, the lower end terminating in a turned flange 12 which overhangs the upwardly inclined apron 13 which leads to the seed inlet 14, and which opens into the side wall of the flue casing F, the upper end of said apron being formed with an upturned flange 15 extending beneath the extension 11 so that sized seeds or grain passed over the grading screen flow directly to said flue.

Any fine seeds or grain screened through the grading screen 10 fall into the inclined bottom plate 16 of the shoe S and discharge, by gravity, into a "fines" spout 17, from which the "fines" discharge into a bin or barrel (not shown).

A feed hopper 18 is mounted on the frame 5 above the scalping screen 8 and includes an inclined bottom plate 19, and a discharge opening 20 is provided between the end of the bottom plate and the side wall 21 of the hopper. A closure plate or gate 22 is mounted on the side wall 21, and has a rack 23 mounted thereon, a gear 24 meshing with said rack and is provided with crank means (not shown) for actuating the gear to adjust the gate and control the seeds or grain fed to the screen.

All of the foregoing is of conventional design and construction, and forms no part of the present invention, which is broadly directed to air duct and flue respectively.

A conventional fan 25 is mounted in the frame 5 and is driven from any convenient source of power, an elongated duct 26 being connected to the fan casing 27, said duct opening into the lower end of the flue casing F, all as clearly shown in Fig. 1 of the drawings.

A suitable gate 28 is pivotally mounted in the duct 26 directly adjacent the fan outlet opening and is swingingly adjustable for controlling the velocity and volume of air forced to the duct by said fan.

The outer end of the duct 26 opens into the lower end of the flue casing F, and the one edge of the duct is flanged as at 29 with the front edge 30 of the flue casing spaced from the flange 29 to provide a discharge opening D therebetween.

The lower end section 31 of the flue casing F is curved inwardly over the duct as shown, thence extending upwardly at an angle as at 32, and gradually converging as shown; thence the flue is reversely curved as at 33; thence extending upwardly and gradually converging up to the point of the seed inlet opening 14, at which point the casing gradually diverges to the point 34. From this point the outer wall section 35 of the flue extends outwardly at an angle, and the opposite side wall 36 is upwardly curved, thus forming pronounced, diverging side walls so that the cross-sectional area of this upper flue section becomes progressively greater.

A tailings or cull spout 37 is connected to the casing F at the upper end of the wall 35 and into which culls, light seed etc. fall from this enlarged low velocity area, said spout leading to a tailings bin or receptacle (not shown), the upper end of the flue casing exhausing to atmosphere.

This controlled air duct and flue is constructed on the convergent-divergent principle which gives a venturi effect to the air flow through the flue. Beginning with the control of the air velocity in the duct 26 by means of the gate 28, air from the fan is blown into the lower and relatively large (in cross-sectional area) end "$a$" of the flue, the air striking the curved outer wall 40 of the flue; thence flowing upwardly into the gradually converging section "$b$"; then striking the inner curved wall 41, flowing upwardly at a slightly higher velocity, into the gradually converging throat section "$c$," past the seed intake opening 14, and I wish to direct particular attention to the fact that due to the principle of the free vortex and due more particularly to the centrifugal effect gained through employing the reverse bend 33 the greatest lifting velocity of the air will be on the inner side wall of the throat section of the flue, and in which the seed entrance 14 is located, consequently, the incoming seed discharges into this high velocity air stream and all of the seed is accurately weighed. The location of the seed entrance is such that a small volume of air is drawn into the flue at this point, but this does not effect the operation of the flue.

The lower end of the flue forms a gradually converging air passage with the lowest pressure area substantially in horizontal alignment with the seed entrance in the throat section "$c$," thus providing greater lifting velocity of the seed at the seed inlet point, and which has been found necessary to lift all of the seeds into one weighing chamber or area.

In practice, the grains or seeds which have been sized by the screening operation enter the flue through inlet 14; thence being picked up by the high velocity air stream weighed in the throat section "$c$," the heavy seeds or grain falling through the air stream onto the inner wall section 42 of the flue; and thence out through the discharge opening D to a bin or the like, all as indicated in Fig. 1 of the drawing.

The light seeds, culls and tailings are lifted and carried up into the high pressure and low velocity area "$e$" of the flue and are thence blown to atmosphere or dropped into the cull or tailings spout 37, where they can be readily collected. Seeds which are of critical weight enter the main air stream and are asperated in the area "$f$," finally dropping onto inclined wall 35, the cycle repeating itself until the seeds either go down or out.

The lifting and weighing velocities for seeds and grain of different weight are obtained by merely adjusting the gate 28, and while the velocities in section "$a$" and "$c$" change somewhat when the gate opening is decreased for such seeds as clover or blue grass, the action of the flue remains the same.

From the foregoing description it will be clearly obvious that I have perfected a very simple, practical and inexpensive seed separating machine for separating seeds and grains of all kinds.

What I claim is:

1. In a seed cleaning machine, a blower fan, a closed duct including a substantially horizontally disposed portion connected thereto and extending outwardly therefrom for delivering air forced thereinto by said fan, the lower wall of the outer end of said horizontal portion of the duct having a grain discharge opening therein, the outer end of said portion of the duct narrowing and being curved upwardly and thence directed inwardly at an acute angle relative to the horizontally disposed portion, said duct having also a portion curving vertically from said inwardly directed portion, a relatively reduced linear throat section for said duct extending from the last-mentioned, vertically curving portion of said duct, the linear throat section of said duct having a feed opening positioned in the inner wall thereof interjacent the ends thereof immediately above the vertically curving duct portion so that the effect of the said last-mentioned, vertically curving duct portion on the air traveling therethrough will cause the portion of air traveling in the throat portion immediately adjacent said feed opening to travel at a relatively greater velocity than the portions of air traveling in the same duct portion opposite said feed opening, said duct having further a diverging portion of relatively large area extending upwardly and outwardly from the upper end of said throat section above said feed opening and out of communication therewith, the diverging portion of said duct having an air blast opening in the outer wall thereof, and a tailings spout depending from said diverging portion of the duct.

2. In a seed cleaning machine, a blower fan, a duct leading therefrom, a reduced, vertically disposed throat comprising a portion of said duct, said throat having a feed opening in a side wall thereof interjacent the ends of the throat portion, a duct portion comprising part of said duct communicating with said fan and approaching said throat portion of the duct at an angle from the side thereof opposite the feed opening, a duct portion comprising part of said duct disposed below said throat portion and curving upwardly from said angularly directed portion into the lower end of said throat section so that air forced through said duct is subjected to a free vortex effect in said curving portion of the duct immediately below said throat portion and has a higher velocity adjacent said feed opening than elsewhere in the throat portion of the duct.

3. In a seed cleaning machine, a blower fan, a duct connected thereto and including a portion extending outwardly therefrom for delivering air forced thereinto by said fan, an upwardly curved duct portion comprising part of said duct directed inwardly at an angle relative to the outwardly extending portion and communicating therewith, a relatively reduced linear throat comprising a portion of said duct extending vertically relative to the inwardly directed portion and an upwardly curved portion comprising part of said duct connecting said inwardly directed portion and throat portion, the throat portion having a feed intake opening immediately above the upwardly curved portion of the duct immediately past which the air has a greater velocity because of the effect of said upwardly curved portion on the air passing therethrough, a diverging portion of relatively large area comprising part of said duct disposed above said feed opening and out of communication therewith and leading upwardly and outwardly from the upper end of said throat portion, said duct having a seed discharge opening below said throat portion.

4. The combination defined in claim 2 in which the wall of said throat portion in which is said feed opening has upper and lower portions above and below said opening.

References Cited in the file of this patent

UNITED STATES PATENTS

| Number | Name | Date |
| --- | --- | --- |
| 11,069 | Keech et al. | June 13, 1854 |
| 258,495 | Sternberg | May 23, 1882 |
| 450,855 | Wottring | Apr. 21, 1891 |
| 485,571 | Barnard | Nov. 1, 1892 |
| 1,592,752 | Bentham | July 13, 1926 |
| 1,597,261 | Bishop | Aug. 24, 1926 |
| 1,861,248 | Stebbins | May 31, 1932 |

FOREIGN PATENTS

| Number | Country | Date |
| --- | --- | --- |
| 738,342 | France | Oct. 17, 1932 |